Feb. 2, 1971 J. M. K. BERGEY 3,560,959
READOUT DEVICE FOR ALTITUDE REPORTING ENCODER
Filed March 22, 1967
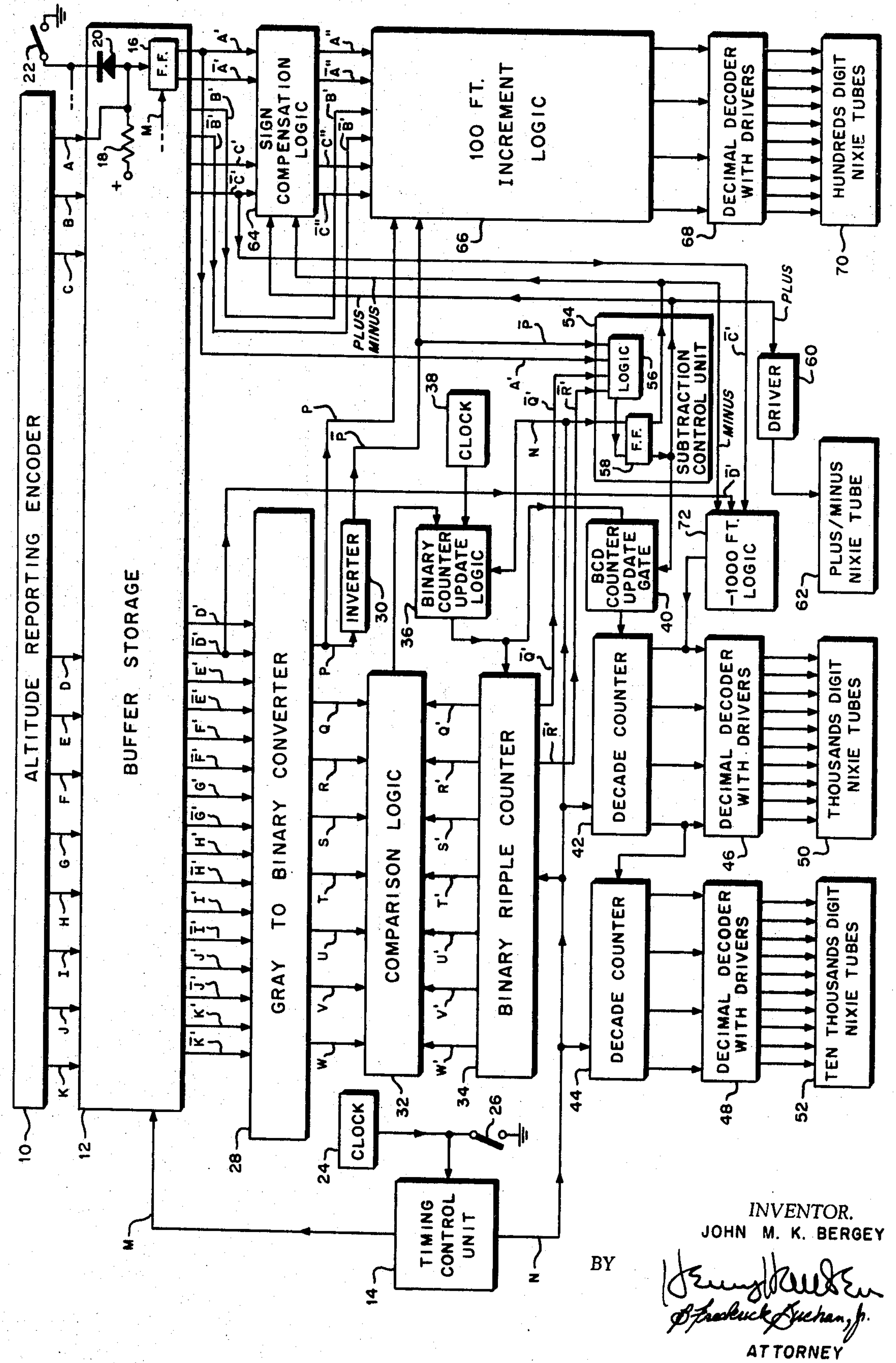
INVENTOR.
JOHN M. K. BERGEY
BY
ATTORNEY

United States Patent Office 3,560,959

Patented Feb. 2, 1971

3,560,959

READOUT DEVICE FOR ALTITUDE REPORTING ENCODER

John M. K. Bergey, Ann Arbor, Mich., assignor to the United States of America as represented by the Secretary of the Navy Filed Mar. 22, 1967, Ser. No. 625,921
Int. Cl. H03k 13/02
U.S. Cl. 340—347 8 Claims

ABSTRACT OF THE DISCLOSURE

A readout device for visually displaying in decimal form the output of an altitude reporting encoder whose eleven parallel digital output signals are coded in the Moa-Gilham code and are indicative of a particular altitude increment within a range extending to levels above and below sea level. The readout device includes special logic circuitry, having an essentially asynchronous mode of operation, for decoding the three least significant output signals of the encoder into a signal for activating the visual display of a hundreds digit for the particular altitude increment being reported. The device also includes a Gray to binary converter, having an essentially asynchronous mode of operation, for converting the eight most significant output signals of the encoder into a binary signal. Circuitry, which operates basically in a synchronous mode, is provided for decoding a more significant portion of the binary signal of the converter and providing an output signal for the activation of a visual display of a thousands digit and a ten thousands digit for the altitude increment being reported by the encoder. Special subtraction control circuitry and logic circuitry are included in the converter decoding circuitry to insure that the proper thousands digit will be displayed. Other circuits are provided for updating the visual display at a flickerless rate, for testing the encoder to see that it is operating and for selectively holding a given visual display when the encoder reported altitude is changing rapidly.

The invention described herein may be manufactured and used by or for the Government of the United States of America for governmental purposes without the payment of any royalties thereon or therefor.

BACKGROUND OF INVENTION

The present invention generally relates to readout apparatus for indicating the output of encoder devices and, more particularly, for indicating complex encoder outputs which employ codes which are actually plural codes in one. Specifically, the invention relates to readout apparatus for providing a direct numerical display of the altitude, above or below sea level, reported by an encoder device.

The overall code sequency of known encoders which employ complex codes or employ codes which, in effect, include two codes in one is difficult to monitor. Mechanization of logic circuitry to effect decoding of the outputs of these encoders is an intricate task. The effects of "edge noise" on the known encoder output signals and, additionally, a continuous decoding operation by known readout devices has necessitated the inclusion of additional logic hardware.

SUMMARY OF INVENTION

A general purpose of the invention is to provide a device of less complexity than heretofore known which avoids the deficiencies of previously known apparatus and which is suitable for indicating the output of an encoder whose more significant parallel digital output signals are coded in a code and whose less significant parallel digital output signals are coded in another code and primarily relate to the least significant portion of the encoder output to be visually indicated. Briefly, this is accomplished by providing logic and indicator circuitry to decode the less significant encoder output signals into a visual display of the less significant portion of the encoder output to be indicated and by providing a converter which is responsive to the more significant encoder output signals for providing a binary signal, the more significant portion of which, in turn, is decoded by decoding circuitry into a visual display of the more significant portion of the encoder output to be visually indicated. More specifically, the latter decoding circuitry includes components for producing a number of pulses corresponding to the binary signal and a counter which, in turn, activates a display. A subtraction control circuitry is provided for subtracting a selected predetermined number of pulses from the number produced to provide a pulse train fed to the counter in order to assure that the proper display of the more significant portion of the encoder output will be effected.

BRIEF DESCRIPTION OF DRAWING

The figure is a schematic and block diagram of an embodiment of an altitude reporting encoder readout device according to the invention.

DESCRIPTION OF PREFERRED EMBODIMENT

The encoder readout device shown in the figure is adapted for use with an altitude reporting encoder 10 whose output signal is arrayed in parallel digital form on 11 output bits in accordance with the Moa-Gilham code, as is broadly indicated in Table I below.

TABLE I

| Encoder bit output signal beginning with least significant bit | Reported altitude in hundreds of feet when bit output signal condition initially becomes "1" | Number of sequential hundred foot altitude increments when bit output signal is in same condition | |
|---|---|---|---|
| | | "1" | "0" |
| A | −14 | 4 | 6 |
| B | −11 | 3 | 2 |
| C | −9 | 4 | 6 |
| D | −7 | 10 | 10 |
| E | −2 | 20 | 20 |
| F | +8 | 40 | 40 |
| G | +28 | 80 | 80 |
| H | +68 | 160 | 160 |
| I | +148 | 320 | 320 |
| J | +308 | 640 | [1] 322 |
| K | +628 | [1] 642 | ([1]) |

[1] The number of sequential increments for the same bit output signal condition is limited by the plus 127,000 feet upper limit of the encoder particularly described.

From Table I it appears that the bit output signals D–K, inclusive, are coded in a conventional reflective code or Gray code beginning at a base of minus 700 feet and that the bit output signals A, B, and C are coded in a different code.

The readout device shown in the figure includes at its input interface a buffer storage unit 12 which is connected to receive and store each of the bit output signals A–K, inclusive, from the encoder 10 upon reception of an appropriate reset signal M from a timing control 14. The buffer storage unit 12 functions to provide output signals A′–K′, inclusive, each having a condition considered as being a "1" when the respective ones of the associated bit output signals A–K, inclusive, have a "1" condition and to provide complementary output signals $\overline{A'}$–$\overline{K'}$, inclusive, having a "1" condition when the respective ones of the associated bit output signals A–K, inclusive, have a "0" condition.

The unit 12 includes, for each of the encoder bit output signals to be received, a flip flop such as 16 which is connected to the encoder 10 and is operable to be set by the respective bit output signal such as A when it has a "1" condition. Flip flop 16 is also connected with the timing control unit 14 and is operable to be preset by the signal M. Thereby, the flip flop 16 provides the output signals A′ and $\overline{A}'$ which are alternatively in a "1" condition or in a "0" condition depending upon the "1" or "0" condition of bit output signal A at the time the timing signal M is received. A resistor 18 is connected between the set input terminal of flip flop 16 and a source of positive potential. Thus, when the particular encoder bit output impedance is not greater than a certain amount, such as 2500 ohms, the signal A is regarded as having a "1" condition, and the storage unit output signal A′ provided by flip flop 16 has a "1" condition, unit output signal $\overline{A}'$ having a "0" condition. If the output impedance for the respective encoder bit becomes greater than the amount, such as 2500 ohms, the bit output signal, such as A, is regarded as having a "0" condition, and storage unit output signal $\overline{A}'$ produced by flip flop 16 has a "1" condition, signal A′ having a "0" condition. The value of the resistance 18 can be changed to alter the threshold switching level of the readout device. Once the flip flops, such as 16, have produced the appropriate output signals, those output signals are maintained in spite of changes in condition of the associated encoder bit output signals until all of the flip flops have been reset by the next occurring timing signal M. Flip flops of the J–K type are well adapted for use in the unit 12.

It is desirable that the readout device include circuitry for testing to see that the readout device is operating properly. Isolation diodes, such as 20, are connected respectively between the set input terminals of a selected combination of flip flops and a normally open test switch 22 having its other side connected to a reference potential, such as ground. To test the device, the encoder 10 is disconnected from its power supply, and the test switch 22 is closed to simulate the appearance of encoder bit output signals in a "1" condition only at the set inputs of the selected flip flops. The display of the readout device may then be checked to see that the appropriate decimal display for the selected combination is being indicated.

The timing control unit 14 is connected to and is actuated by a clock 24 which delivers a series of trigger pulses at a flickerless rate, such as 400 trigger pulses per second so that a flickerless decimal display may be obtained. Timing control unit 14 emits in addition to signal M another trigger signal N, the use of which is hereinafter more fully explained. The signal N desirably has a duration shorter than signal M and should occur during the occurrence of signal M. An example of suitable circuitry for the unit 14 is a pair of cascaded single-shot multivibrators, the first of which will emit a timing pulse M in response to triggering by the clock 24 and the second of which will emit a timing pulse N having a shorter duration than that of M in response to activation by the leading edge of timing signal M. At times the encoder 10 may be reporting very rapidly changing altitudes, such as when it is being tested. Hence, a normally open test switch 26 having one of its terminals connected to ground is connected to the output of the clock 24 for selectively diverting the trigger pulses to ground so that the timing control unit 14 will not produce the timing signal M and will not, thereby, cause the buffer storage unit 12 to change the existing conditions of its various output signals A′–K′, inclusive and $\overline{A}'$–$\overline{K}'$, inclusive.

Buffer storage output signals D′–K′, inclusive, and their complements $\overline{D}'$–$\overline{K}'$, inclusive, are all fed to a conventional Gray to binary converter 28 which provides a signal in natural binary form in response to the particular corresponding combination of signal conditions provided thereto, which signal is indicated by a plurality of converter output signals P–W, inclusive, which correspondingly have "1" or "0" conditions. The output signal P from the least significant output bit of the converter 28 is fed through an inverter 30 to provide a complementary signal $\overline{P}$. The output signals P and $\overline{P}$, which alternatively have a "1" condition, indicate whether the number of the storage unit output signals D′–K′, inclusive, which have a "1" condition is alternatively odd or even. The other converter output signals Q–W, inclusive, are fed to a comparison logic circuit 32 which receives a parallel array of output signals Q′–W′, inclusive, from a seven stage, natural binary counter 34.

The comparison logic 32 provides an error signal whenever the "1" or "0" conditions of corresponding output signals, such as Q and Q′, respectively from the converter 28 and the counter 34, are not the same. This error signal is fed to an input terminal of a binary counter update logic 36 along with clock pulses from a free running clock 38 having a higher output frequency than clock 24, e.g., two megacycles. The logic 36 is connected to receive the signal N from timing control 14 and functions, so long as it is not inhibited by signal N and so long as an error signal is being received from the logic 32, to effectively pass the pulses from the clock 38 to the counter 34. Thus, clock pulses will be directed to the counter 34 until identity in the combinations of conditions of both the parallel output signals Q–W, inclusive, of the converter 28 and the parallel output signals Q′–W′, inclusive, of the counter 34 is achieved.

The clock pulses fed to the counter 34 are also fed to a binary counter update gate 40, which, if enabled, effectively directs those pulses to a pair of cascaded binary decade counters 42 and 44 whose output signals, being in natural binary form, are fed to respective decimal decoders 46 and 48. The decoders 46 and 48 each include circuits for driving a corresponding numeral-shaped Nixie tube respectively in a thousands digit display 50 and a ten-thousands digit display 52. In order that the binary counter 34 and the decade counters 42 and 44 may be reset to zero, each is connected to receive the signal N from timing control unit 14. Of course, from the above, it is apparent that enough pulses will be received by the counter 34 to register any count within its limits before the occurrence of another timing signal N which would reset the counter 34 to zero.

To enable the displays 50 and 52 to always display that particular decimal which accords with the particular combination of encoder output signals received, it is necessary that either one or two pulses be subtracted from the train of pulses counted by the counter 34 before the pulse train is fed to the counters 42 and 44. To accomplish the pulse subtraction, a subtraction control unit 54 is provided which produces a gate enabling output signal fed to enable the gate 40 after the number of pulses to be subtracted has been counted by the counter 34. Since the reference or base for the Gray code count provided by the encoder bit output signals D–K, inclusive, is minus seven hundred feet instead of zero feet or sea level, and since the incremental transitions of the Gray count are not synchronized with the nine to zero transition of the hundred foot increments, the subtraction control unit 54 functions to inhibit, i.e., fail to enable, the gate 40 until after the counter 34 has counted either the first one or the first two pulses received from the logic 36.

The subtraction control unit 54 will normally function to cause the subtraction of one pulse from the pulse train fed to the counter 42. In order that the unit 54 may ascertain whether one or two pulses have been effectively subtracted, the counter 34 includes circuitry for providing output signals $\overline{Q}'$ and $\overline{R}'$ from the two least significant states thereof, $\overline{Q}'$ having a "1" condition when Q has a "0" condition, and $\overline{R}'$ having a "1" condition when R′ has a "0" condition. Thus, when $\overline{Q}'$ is a "0" and $\overline{R}'$ is a "1," at least one pulse will have been counted by the counter 34 which was not passed by the gate 40 to the counter 42. Similarly, when $\overline{Q}'$ is a "1" and $\overline{R}'$ is a "0," at least two pulses will have been counted by the counter 34 which were not counted by the counter 42.

From Table I is appears that the encoder output bit signals F–K, inclusive, first become a "1" when altitudes of +800 feet, +2800 feet, etc., respectively, occur and, thereby cause the output signals Q–W, inclusive, of the converter 28 to indicate at those altitudes a binary two instead of a binary one, or a binary three instead of a binary two, etc. Therefore, not only one pulse but also an additional pulse must be subtracted from the pulse train fed to the counter 42 when the hundreds feed increment is an eight or a nine. This particular condition is uniquely specified when encoder bit output signal A is a "1" and when the number, including zero, of the encoder bit output signals D–K, inclusive, which have a "1" condition is even. The unit 54 is mechanized so that during the simultaneous presence of the above conditions a unit output signal to enable the gate 40 will not be produced until after two clock pulses have been counted by the counter 34.

The unit 54 includes a control logic 56 for regulating the subtraction routine, which logic 56 is connected to receive both storage unit output signal A′, which is a "1" when A is a "1," and converter output signal $\overline{P}$, which is a "1" when there is an even number of the storage unit output signals D′–K′, inclusive, which have a "1" condition. Logic 56 is also connected to the counter 34 to receive the complementary output signals $\overline{Q}'$ and $\overline{R}'$ from the two least significant stages of the counter 34 and produces a logic output signal ordinarily when signals $\overline{Q}'$ and $\overline{R}'$ indicate that one pulse has been counted by the counter 34. However, when A′ and $\overline{P}$ both have "1" conditions, the logic 56 will not produce an output signal until signals $\overline{Q}'$ and $\overline{R}'$ indicate that two pulses have been counted by counter 34. The output signal which is provided by logic 56 as indicated above is fed to set a flip flop 58. Flip flop 58 which is connected to the timing control unit 14 to receive the timing signal N, is adapted to be reset thereby for providing a reset output signal and provides a set or an enabling output signal upon being set, which enabling signal is fed to enable the gate 40 to effectively pass pulses received from the logic 36 to the counter 42.

The above-described subtraction control unit 54 inherently includes circuitry for ascertaining and producing signals indicating whether or not the reported altitude to be displayed in decimal form is plus or minus. This information, as is hereinafter shown, is need both in order to effect the display of a plus or a minus sign and in order to decode in a most simple manner the encoder bit output signals A, B and C and activate a decimal display of the appropriate numeral for the hundred feet altitude increment. From Table I it can be shown that the counter 34 will receive at least two pulses from the logic 36 at altitude increments of +800 feet and above since the output signals Q–W, inclusive, of the converter 28 become a binary two at that altitude increment. Therefore, whether or not $\overline{P}$ and A′ both have a "1" condition, the logic 56 will eventually produce an output signal to set the flip flop 58. At altitude increments from zero to +700 feet, counter 34 will count one pulse. Since, from Table I, bit output signal A will be a "0" at the altitude increments from zero to +500 feet and $\overline{P}$ will be a "0" from +300 to +1200 feet, the unit 54 need only cause one pulse to be subtracted. Hence, the logic 56 will always set the flip flop 58 at these positive altitude increments. Therefore, the presence of the enabling output signal from the flip flop 58 will additionally indicate a positive or plus altitude.

However, when the encoder reported altitude is to be minus, i.e., one below sea level, the logic 56 will not produce an output signal to set the flip flop 58. From Table I it may be ascertained that at altitude increments below −200 feet converter output signals Q–W, inclusive, will remain in a "0" condition. Therefore, the counter 34 will count no pulses and neither of the conditions for the production of a flip flop setting output signal by the logic 56 exist. Although the counter 34 will count one pulse at the altitude increments of −200 feet and −100 feet, it can be demonstrated that both storage unit output signal A′ and inverter output signal $\overline{P}$ will have a "1" condition at those altitude increments. While the unit 54 will thereby be directed to cause the subtraction of two pulses, a second pulse will not be provided to the counter 34. Therefore, at altitude increments of −200 feet and −100 feet, the logic 56 will not be caused to produce an output signal for setting the flip flop 58. Hence, a reset output signal signifying a minus altitude can continue to appear at the reset output terminal of the flip flop 58.

The plus signal from the set output terminal of the flip flop 58 of the unit 54 is fed to a driver 60 which, in turn, responsively activates a plus/minus Nixie tube display 62. The display 62 is of the type having a horizontal Nixie bar which is always being activated and a vertical Nixie bar which is selectively activated by the driver 60 in order to convert the minus display to a plus display when the plus signal is being received by the driver 60. Alternatively, separate plus-shaped and minus-shaped Nixie tubes could be activated by respective drivers each activated, in turn, by a respective one of the plus and minus signals from the flip flop 58 of the unit 54.

In order to provide a display of the hundreds digit for the altitude being reported by the encoder 10, the storage unit output signals A′, $\overline{A}'$, C′ and $\overline{C}'$ are fed to a sign compensation logic 64 which is also connected to receive the plus and minus signals from the flip flop 58 of the unit 54. The logic 64 is such that it provides output signals A″, $\overline{A}''$, C″ and $\overline{C}''$ which have "1" conditions respectively both when the corresponding ones of the input signals A′, $\overline{A}'$, C′ and $\overline{C}'$ have "1" conditions and when the plus signal has a "1" condition. Alternatively, when the minus signal has a "1" condition, A″ is a "1" if C′ is a "1," $\overline{A}''$ is a "1" if $\overline{C}'$ is a "1," C″ is a "1" if A′ is a "1," and $\overline{C}''$ is a "1" if $\overline{A}'$ is a "1." The output signals of the logic 64 are fed along with the storage unit output signals B′ and $\overline{B}'$ to a hundreds foot increment logic 66 for decoding into a natural binary output signal which, in turn, is fed to a decimal decoder 68 whose output signals, in turn, are suitable for driving respective numeral-shaped Nixie tubes in a hundreds digits display 70.

It can shown from Table I that, for encoder reported altitudes above zero, the arrangement of the conditions of encoder bit output signals A, B and C is reflective between each of the 200 foot increments and the adjacent 300 foot increments. Additionally, the hundreds digit is to be indicated as being one of 8, 9, 0, 1 or 2 when the number of the encoder bit outputs D–K, inclusive, which have a "1" condition is even; and the hundreds digit is to be indicated as being one of 7, 6, 5, 4, or 3 when the number of those having a "1" condition is odd. Hence, the logic 66 is also connected to receive the output signals P and $\overline{P}$ from the converter 28 and the inverter 30 and functions to provide an output signal designating the numbers of Table II in natural binary form to the decimal decoder 68.

TABLE II

| Combination of those output signals received by logic 66 from logic 64 having a "1" condition | | | Decimal to be displayed when signal has a "1" condition | |
|---|---|---|---|---|
| | | | P | $\overline{P}$ |
| $\overline{C}''$ | $\overline{B}'$ | A″ | 7 | 8 |
| $\overline{C}''$ | B′ | A″ | 6 | 9 |
| $\overline{C}''$ | B′ | $\overline{A}''$ | 5 | 0 |
| C″ | B′ | $\overline{A}''$ | 4 | 1 |
| C″ | $\overline{B}'$ | $\overline{A}''$ | 3 | 2 |

The sign compensation logic 64 and the logic 63 function to cause the decoder 68 to activate the appropriate numeral-shaped Nixie tube in the display 70 irregardless of whether the encoder reported altitude is above or below sea level. For example, at altitudes below sea level, the sign compensation logic 64 is receiving a minus signal in a "1" condition from the unit 54. At an altitude of −100 feet, encoder bit output signals A and B have "1" conditions and signal C has a "0" condition. The display of the hundreds digit is mechanized so that a minus "one" is displayed for the hundreds feet increment immediately preceding zero instead of a "nine," as would be displayed for levels above sea level, because the minus sign in a "1" condition from the unit 54 causes the logic 64 to produce output signals wherein $\overline{A}''$ and C″ have "1" conditions instead of those wherein A″ and C″ have "1" conditions, as would be the case had the plus signal had a "1" condition. Since $\overline{P}$ has a "1" condition at an altitude increment of −100 feet, it appears from Table II that a "one," not a "nine," will be displayed by the display 70.

Since at altitudes below sea level the gate 40 will not have been enabled to pass a pulse to the decade counter 42, the "zero" Nixie tubes in the displays 50 and 52 will continue to be activated. Therefore, in order to properly display negative altitude increments in excess of the minus 900 feet increment, a minus thousand foot logic 72 is provided whose output signal is fed to the input of the least significant stage of the decoder 46 which, in turn, will activate the "one" shaped Nixie tube in the display 50. From Table I it appears that encoder bit output signal C first becomes a "1" at minus 900 feet and that either or both of the encoder bit output signals C and D have a "1" condition at altitude increments from minus 900 feet to zero. Therefore, it appears that the "one" Nixie tube in the display 50 need be activated only when the bit output signals C and D both have a "0" condition and when the minus signal has a "1" condition. Consequently, the logic 72 is connected to receive the storage unit output signals $\overline{C}'$ and $\overline{D}'$, and the minus output signal from the unit 54, and provides a logic output signal when all of the signals received have a "1" condition, which logic output signal causes the decoder 46 to cause a "one" to be displayed.

Generally, the mode of operation of the readout device described above proceeds in the following manner. The clock 24 produces a series of clock pulses which have a frequency which is less than the frequency of the pulses emitted by the clock 38. The timing control unit 14 produces in response to pulses from the clock 24 a timing signal M which enables the buffer storage unit 12 to receive, store and signal the existing combination of conditions of the encoder bit output signals being received from the encoder 10. The timing signal N is generated during the occurrence of timing signal M so that the counters 34, 42 and 44 may be set to zero and are not affected by any changes in the condition of the output signals of the storage unit 12 while it is being reset. The converter 28 converts the particular combination of conditions of the storage unit output signal D′–K′, inclusive, and $\overline{D}'$–$\overline{K}'$, inclusive, into a corresponding binary number, and the comparison logic 32 provides an error signal which enables logic 36 to provide pulses to the counter 34 in response to the clock 38 until the output signals Q′–W′, inclusive, of the counter 34 and the output signals Q–W, inclusive, of the converter have identical corresponding conditions. Logic 56 of the unit 54 ascertains whether one or two pulses are to be subtracted from the pulse train passed by the logic 36 and fed through the enabled gate 40 to the decade counter 42. Logic 56 sets the flip flop 58 after the appropriate number of pulses have been substracted. The flip flop 58, in turn, enables the gate 40 to pass pulses thereafter received to the counter 42. The counters 42 and 44 cause their respective decoders 46 and 48 to each sequentially activate the numeral-shaped Nixie tubes in the respective displays 50 and 52 until the disappearance of the error signal from the logic 32 blocks the passage of more pulses to the counter 42. Simultaneously, the three least significant encoder bit output signals A, B, and C have been processed through the sign compensation logic 64 and the logic 66, whose binary output signal, in turn, causes decoder 68 to activate the appropriate numeral-shaped Nixie tube in the hundreds digit display 70. The above described process is repeated each time the timing pulses M and N are provided by timing control unit 14, and the resulting decimal display appears to be flickerless.

The readout device described may be better understood by the following numerical examples. When the encoder 10 is to report an altitude of +2500 feet only encoder bit output signals B and F have "1" conditions. In response thereto, the converter 28 provides output signals P, Q and R which all have "1" conditions, the remaining output signals thereof having "0" conditions. Hence, the comparison logic 32 generates an error signal until counter 34 receives three pulses from logic 36. Since P, the output of inverter 30, and A′, an output signal from the buffer storage unit 12, have "0" conditions, the logic 56 of the control unit 54 sets the flip flop 58 so that the gate 40 is enabled to pass pulses from the logic 36 after the first pulse has been counted by the counter 34, $\overline{Q}'$ being a "0" and $\overline{R}'$ being a "1." Hence, one pulse has been substracted from the pulse train, and counter 42 receives and counts only two pulses. Thereby, decoder 46 is caused to activate the "two" Nixie tube in display 50. Simultaneously, $\overline{C}''$, B′, $\overline{A}''$ and $\overline{P}$ having "1" conditions, the logic bank 66 causes the decoder 68 to actuate the "five" Nixie tube in display 70. Since the flip flop 58 has been set, a plus signal having a "1" condition has been fed to driver 60 which causes the display 62 to display a "plus" sign, indicating a positive altitude.

When the encoder 10 is to report an altitude of +2800 feet, the encoder bit output signals A, F and G have "1" conditions, the rest having "0" conditions. Hence, only output signal S of the converter 28 will have a "1" condition. Comparison logic 32 will generate an error signal so that the counter 34 will receive four pulses. Since the inverter output signal $\overline{P}$ has a "1" condition and since A′ has a "1" condition, the logic 56 will cause the flip flop 58 to be set after the second pulse has been counted by the counter 34, $\overline{R}'$ being a "0" and $\overline{Q}'$ being a "1." Since gate 40 was not enabled until after the first two pulses from the logic 36 have been counted the counter 42 receives and counts only two pulses and decoder 46 activates the "two" Nixie tube in the display 50. Since the flip flop 58 has been set, a plus signal having a "1" condition has been produced which is fed to the driver 60 to cause the display of a "plus" sign and is fed to the logic 64 so that the output signals $\overline{C}''$ and A″ have "1" conditions. Therefore, the logic 66, which is receiving the signals $\overline{C}''$, $\overline{B}'$, $\overline{A}''$ and $\overline{P}$ all having a "1" condition, will cause the decoder 68 to activate the "eight" Nixie tube in display 70.

When the encoder 10 is to report an altitude of −300 feet, the encoder bit output signals A and D have a "1" condition, the remainder having a "0" condition. Hence, the converter 28 will provide an output wherein only P has a "1" condition. The comparison logic 32 will produce no error signal, counter 34 having been reset to zero by timing signal N. Since $\overline{Q}'$ and $\overline{R}'$ both have a "1" condition, the logic 56 will not be caused to set the flip flop 58. Hence, the minus signal provided from the unit 54 will have a "1" condition, and the logic 64 will provide output signals C″ and $\overline{A}''$ which have a "1" condition. Since $\overline{B}'$ and P each have a "1" condition, the logic 66 will cause the decoder 68 to activate the "three" nixie tube in the display 70, a "minus" sign being displayed by display 62.

From the foregoing description it is apparent that a simpler readout device has been provided. The device may easily be fabricated from commercially available converters, storage units, counters and logic gates. Mechanization problems involved in continually decoding encoder outputs all the time have been avoided by providing a device wherein the visual display is updated at a flickerless rate. The readout device described is also very useful for testing encoders to see that they are operating properly.

It should be understood, of course, that the foregoing disclosure relates only to a preferred embodiment of the invention and that numerous modifications or alterations may be made without departing from the spirit and scope of the invention as set forth in the appended claims.

What is claimed is:

1. Apparatus for indicating the output of an encoder device of the type providing a plurality of parallel output signals each indicative of one of a plurality of conditions, a first group of signals in the plurality relating to a more significant portion of the encoder output to be indicated and a second group of signals in the plurality relating to a less significant portion of the encoder output to be indicated, said apparatus comprising:

converter means adapted for operatively receiving the encoder output signals of the first group and for providing a corresponding first binary signal for each combination of signal conditions in the first group;

clock means for providing pulses;

binary counter means connected to said clock means for receiving and counting said pulses and for providing a secondary binary output signal indicative of the count;

comparison means connected to said converter means to receive said more significant portion of said first binary signal and connected to said binary counter means to receive said second binary output signal for providing an error signal;

said clock means being connected to said comparison means for receiving said error signal, said clock means providing said pulses when said error signal is being received thereby;

second counter means connected to said clock means to receive said pulses for counting a portion of said pulses received thereby and for providing an output signal indicative of the corresponding more significant portion of the encoder output to be indicated;

first display means connected to said second counter means to receive said output signal thereof for displaying in decimal form the corresponding more significant portion of the encoder output to be indicated;

first logic means adapted for operatively receiving the encoder output signals of the second group and connected to said converter means to receive a less significant portion of said first binary signal for providing an output signal indicative of the corresponding less significant portion of the encoder output to be indicated; and second display means connected to said first logic means to receive said output signal thereof for displaying the corresponding less significant portion of the encoder output to be indicated.

2. Apparatus according to claim 1 wherein said second counter means includes:

second logic means connected to said binary counter means to receive a less significant portion of said second binary output signal and connected to said clock means to receive said pulses for subtracting a number of pulses from those provided by said clock means to provide said portion of pulses which is to be counted by said second counter means.

3. Apparatus according to claim 2 wherein:

said second logic means is adapted for operatively receiving an encoder output signal from the second group and is connected to said converter means to receive a less significant portion of said first binary output signal for selectively subtracting particular numbers of pulses from those provided by said clock means in response to respective particular combinations of the conditions of said signals received.

4. Apparatus for indicating the output of an encoder device of the type providing a plurality of parallel output signals each indicative of one of a plurality of conditions, a first group of signals in the plurality relating to a more significant portion of the encoder output to be indicated and a second group of signals in the plurality relating to a less significant portion of the encoder output to be indicated, said apparatus comprising:

buffer storage means adapted for operatively receiving the first and second groups of encoder output signals and being responsive to the output impedances of the encoder device for providing corresponding first and second groups of output signals respectively indicative of the conditions of corresponding ones of the encoder output signals;

converter means being connected to said buffer storage means to receive the encoder output signals of the first group for providing a corresponding first binary signal for each combination of signal conditions in the first group;

pulse providing means connected to said converter means to receive said more significant portion of said first binary signal for providing numbers of pulses corresponding respectively to said more significant portion of said first binary signal;

counter means connected to said pulse providing means to receive said pulses for counting a portion of said pulses received and for providing an output signal indicative of the corresponding more significant portion of the encoder output to be indicated;

first display means connected to said counter means to receive said output signal thereof for displaying in decimal form the corresponding more significant portion of the encoder output to be indicated;

first logic means connected to said buffer storage means to receive the encoder output signals of the second group and connected to said converter means to receive a less significant portion of said first binary signal for providing an output signal indicative of the corresponding less significant portion of the encoder output to be indicated; and second display means connected to said first logic means to receive said output signal thereof for displaying the corresponding less significant portion of the encoder output to be indicated.

5. Apparatus for indicating the output of an encoder device of the type providing a plurality of parallel output signals each indicative of one of a plurality of conditions, a first group of signals in the plurality relating to a more significant portion of the encoder output to be indicated and a second group of signals in the plurality relating to a less significant portion of the encoder output to be indicated, said apparatus comprising:

buffer storage means adapted for operatively receiving the first and second groups of encoder output signals and being responsive to the output impedances of the encoder device for providing corresponding first and second groups of output signals respectively indicative of the conditions of corresponding ones of the encoder output signals;

said buffer storage means including a plurality of flip flops for collectively providing said corresponding first and second group of output signals, each said flip flop having an input terminal adapted for operatively receiving a respective one of the plurality of the encoder output signals; and a plurality of resistive means each connected between a source of potential and a respective one of said input terminals of said flip flops;

converter means connected to said buffer storage means to receive the encoder output signals of the first group and for providing a corresponding first binary signal for each combination of signal conditions in the first group;

first display means connected to said converter means to receive a more significant portion of said first binary signal for displaying the corresponding more significant portion of the encoder output to be indicated;

first logic means connected to said buffer storage means to receive the encoder output signals of the second group and connected to said converter means to receive a less significant portion of said first binary signal for providing an output signal indicative of the corresponding less significant portion of the encoder output to be indicated; and second display means connected to said first logic means to receive said output signal thereof for displaying the corresponding less significant portion of the encoder output to be indicated.

6. Apparatus according to claim 5 further comprising:

timing means providing a series of timing pulses which occur at a predetermined frequency sufficiently great to enable a display thereof to appear flickerless;

said flip flops each being connected to said timing control means for receiving said timing pulses and providing said output signals in respective conditions determined by the condition of the respective encoder output signals received thereby at the time said timing pulse occurs.

7. Apparatus for indicating the output of the encoder device of the type reporting altitudes above and below sea level and providing an altitude-increment-related plurality of parallel output signals each indicative of one of a plurality of conditions in accordance with a given altitude to be indicated, a first group of signals in the plurality relating to a more significant portion of the given altitude to be indicated and a second group of signals in the plurality relating to a less significant portion of the given altitude to be indicated and a second group of signals in the plurality relating to a less significant portion of the given altitude to be indicated, said apparatus comprising:

converter means adapted for operatively receiving the encoder output signals of the first group and for providing a corresponding binary signal for each combination of signal conditions in the first group;

pulse providing means connected to said converter means to receive the more significant portion of said binary signal for providing numbers of pulses corresponding respectively to said binary signal;

first logic means connected to said pulse providing means for providing a first logic output signal when predetermined numbers of pulses have been provided by said pulse providing means and the given altitude to be indicated is above sea level;

first indicator means connected to said first logic means to receive said first logic output signal for displaying a visual indication that the given altitude to be indicated is above sea level;

gate means connected to said pulse providing means to receive said pulses and connected to said first logic means to receive said first logic output signal for providing pulses when said gate means is being enabled by said first logic output signal, said gate being inhibited during the occurrence of said predetermined numbers of pulses;

counter means connected to said gate means to receive said pulses therefrom for counting said pulses received and for providing an output signal indicative of the corresponding more significant portion of the altitude to be indicated;

second indicator means connected to said counter means to receive said output signal thereof for displaying in decimal form the corresponding more significant portion of the altitude to be indicated;

second logic means adapted for operatively receiving the encoder output signals of the second group and connected to said converter means to receive a less significant portion of said binary signal thereof for providing an output signal indicative of the corresponding less significant portion of the altitude to be indicated; and third display means connected to said second logic means to receive said display means thereof for displaying the corresponding less significant portion of the altitude to be indicated.

8. Apparatus according to claim 7 wherein:

said first logic means is adapted for operatively receiving an encoder output signal from said second group of signals and is connected to said converter means to receive a less significant portion of said binary signal for selectively providing said first logic signal when a first and, alternatively, in response to the conditions of said signals received, a second said predetermined number of pulses has been provided by said pulse providing means.

References Cited

UNITED STATES PATENTS

| | | | |
|---|---|---|---|
| 3,380,031 | 4/1968 | Clayton et al. | 340—324 |
| 3,401,385 | 9/1968 | Jaffe | 340—324 |
| 3,445,827 | 5/1969 | Keyes ___6_ | 340—324 |
| 3,165,731 | 1/1965 | Spaulding | 235—154X |

MAYNARD R. WILBUR, Primary Examiner

C. D. MILLER, Assistant Examiner

U.S. Cl. X.R.

340—324